US007423215B2

(12) United States Patent
Cardenas et al.

(10) Patent No.: US 7,423,215 B2
(45) Date of Patent: Sep. 9, 2008

(54) EXPANDABLE STRUCTURED WIRING BOX

(75) Inventors: Herman Cardenas, Austin, TX (US);
Jens Bolleyer, Arden Hills, MN (US);
Jeffrey Wilson, Colgate, WI (US);
Robert Marvin, Farmington, CT (US);
Randolph Maxwell, El Paso, TX (US);
Kevin Patin, El Paso, TX (US)

(73) Assignee: GE Security, Inc., Bradenton, FL (US)

( * ) Notice: Subject to any disclaimer, the term of this patent is extended or adjusted under 35 U.S.C. 154(b) by 311 days.

(21) Appl. No.: 10/488,833

(22) PCT Filed: Sep. 5, 2002
(Under 37 CFR 1.47)

(86) PCT No.: PCT/US02/28093

§ 371 (c)(1),
(2), (4) Date: Dec. 20, 2005

(87) PCT Pub. No.: WO03/023926

PCT Pub. Date: Mar. 20, 2003

(65) Prior Publication Data

US 2006/0231278 A1 Oct. 19, 2006

(51) Int. Cl.
*H02G 3/08* (2006.01)
(52) U.S. Cl. .................. 174/50; 174/480; 174/481; 174/53; 174/57; 220/3.2; 220/3.3
(58) Field of Classification Search ........... 174/50, 174/481, 480, 53, 57, 58, 61, 54, 62, 63, 174/135, 17 R; 220/3.2–3.9, 4.01, 4.02; 361/600, 601, 622, 659, 652, 724, 730, 824; 439/535; 248/906; D13/160, 152
See application file for complete search history.

(56) References Cited

U.S. PATENT DOCUMENTS

| | | | | | |
|---|---|---|---|---|---|
| 3,566,194 | A | * | 2/1971 | Gryctko | 361/652 |
| 3,618,804 | A | * | 11/1971 | Krause | 174/50 |
| D318,652 | S | * | 7/1991 | Buchanan | D13/160 |
| 5,326,931 | A | * | 7/1994 | Cain et al. | 174/58 |
| 5,463,533 | A | * | 10/1995 | Donnerstag et al. | 174/57 |
| 5,638,256 | A | * | 6/1997 | Leach et al. | 174/58 |
| 6,132,242 | A | * | 10/2000 | Hall et al. | 361/824 |
| 6,460,951 | B1 | * | 10/2002 | Baxter et al. | 174/50 |
| 6,603,660 | B1 | * | 8/2003 | Ehn et al. | 361/724 |
| 6,649,830 | B1 | * | 11/2003 | Bartlett et al. | 174/50 |
| 6,727,429 | B1 | * | 4/2004 | Koessler | 174/50 |
| 6,953,895 | B2 | * | 10/2005 | L'Henaff et al. | 174/50 |
| 7,049,516 | B1 | * | 5/2006 | Haag et al. | 174/481 |

* cited by examiner

*Primary Examiner*—Angel R Estrada
(74) *Attorney, Agent, or Firm*—Global Patent Operation (57) ABSTRACT

A device (100) for receiving electrical components and wiring and adapted for mounting between adjacent studs of a wall structure, the device (100) includes means forming a composite chamber and having a box (100) with parallel, spaced apart right and left side panels (102, 103) for attachment to studs and spaced apart top and bottom panels (104, 105) having ends joined to ends of the right and left panels (102, 103) and arranged so as to form a housing chamber (112) at least partially forming the composite chamber. At least one framework (225) is movable between a first position within the composite chamber and a second position outside the composite chamber, the one framework (225) being shaped and arranged to receive electrical components.

16 Claims, 9 Drawing Sheets

EXPANDABLE STRUCTURED WIRING BOX

FIELD OF THE INVENTION

The present invention is generally related to structured boxes used to manage and organize wiring for household communications systems and to improve access thereto and maintenance thereof. More specifically, it is related to such a box that is adapted for mounting within a wall and to means for expanding such a box, as additional space is required therein.

BACKGROUND AND OBJECTS OF THE INVENTION

Household structured wiring boxes are used to centrally unite input signal wires and output wires distributed throughout the house. Since each house may have different signals coming in and differing distribution needs, distribution and amplification modules are placed in the structured wiring box to customize the configuration and distribution for each house.

In current structured wiring boxes, it is very time consuming to wire up the modules, add new modules or wiring, or rewire to change the distribution. This is due in part to the confined space of boxes and the growing obstruction caused by the wires that are connected therein, especially as more wires and electrical components are added during aftermarket upgrading. The ideal structured wiring box would be organized in a manner that simplifies later upgrading and reduces confusion, unlike current structured wiring boxes.

In existing boxes, upgrading to add significantly new functionality even within one manufacturer's product line can also present problems, and sometimes requires the complete removal and replacement of an entire original box at great expense and trouble. The ideal structured wiring box would support changing distribution needs and potentially new modules over its lifespan, and would be both flexible and expandable.

Further, since these boxes are built into the home, the ideal structured wiring box would have a housing that anticipates and accepts future technology without requiring carpentry or reconstruction of the home over the life of the home rather than just over the shorter life of the technology. Functional and permanently installed portions of the box would remain functional over the life of the home and would not become obsolete as the technology within becomes obsolete. Visible portions of the box would either remain fashionable over the life of the home and not become outdated as the technology within becomes outdated or could be easily replaced as styles later change without requiring carpentry or reconstruction of the home.

It is therefore an object of the present invention to provide a structured wiring box for household use that is easier to install and use and that more readily facilitates initial wiring and later upgrading.

It is a further object to provide such a structured wiring box that eliminates the need for reconstruction and carpentry during later upgrading and over the life of the home into which it is installed.

It is a further object to provide such a structured wiring box that is adaptable to remain aesthetically pleasing over the expected life of the home, rather than just over the life of the technology within the box.

Further objects and advantages of the present invention will become apparent upon review of the following drawings and description of a preferred embodiment thereof.

SUMMARY OF THE INVENTION

The invention consists of a device for receiving electrical components and wiring and adapted for mounting between adjacent studs of a wall structure, the device includes means forming a composite chamber and having a box with parallel, spaced apart right and left side panels for attachment to studs and spaced apart top and bottom panels having ends joined to ends of the right and left panels and arranged so as to form a housing chamber at least partially forming the composite chamber. Also provided is at least one framework movable between a first position within the composite chamber and a second position outside the composite chamber, the one framework being shaped and arranged to receive electrical components. The framework in its second position accommodates electrical module wiring and maintenance.

According to one feature of the invention, the framework is pivotally mounted and movable between the first position and the second position. The pivotal mounting facilitates movement of the framework.

According to another feature, the one framework is mounted adjacent to an outer edge of one of the side panels. This feature provides unencumbered movement of the framework.

According to yet another feature, the one framework defines a plurality of substantially parallel rows of spaces, each shaped to receive an electrical module and further defines at least one electrical wire raceway disposed between adjacent rows of spaces. The spaces and raceway facilitate organized mounting and wiring of modules.

According to a further feature of the invention, each raceway includes side walls defining openings into adjacent rows, said openings accommodating the passage of electrical wires. Preferably, the openings are vertical slots separated by fingers forming the side walls.

According to still another feature, the framework includes a detachable cover closing each raceway. The cover helps maintain organized positioning of wiring.

According to other features, the spaces are separated by scored detachable strips, the rows include at least three and the raceways comprise at least two. These features facilitate wiring capacity expansion.

According to an important feature, the housing further includes an annular frame surrounding outer edges of the panels and defining an extension chamber forming an outer portion of the composite chamber. The expansion chamber allows expansion of wiring capacity.

According to one embodiment, the one framework is slidably mounted at an angle in the housing chamber and disposed at least partially in the expansion chamber. This feature also facilitates wiring capacity expansion.

BRIEF DESCRIPTION OF THE DRAWINGS

These and other objects and features of the invention will become more apparent upon a perusal of the following description taken in conjunction with the accompanying drawings wherein.

DETAILED DESCRIPTION OF THE PREFERRED EMBODIMENT OF THE INVENTION

Figure 1:
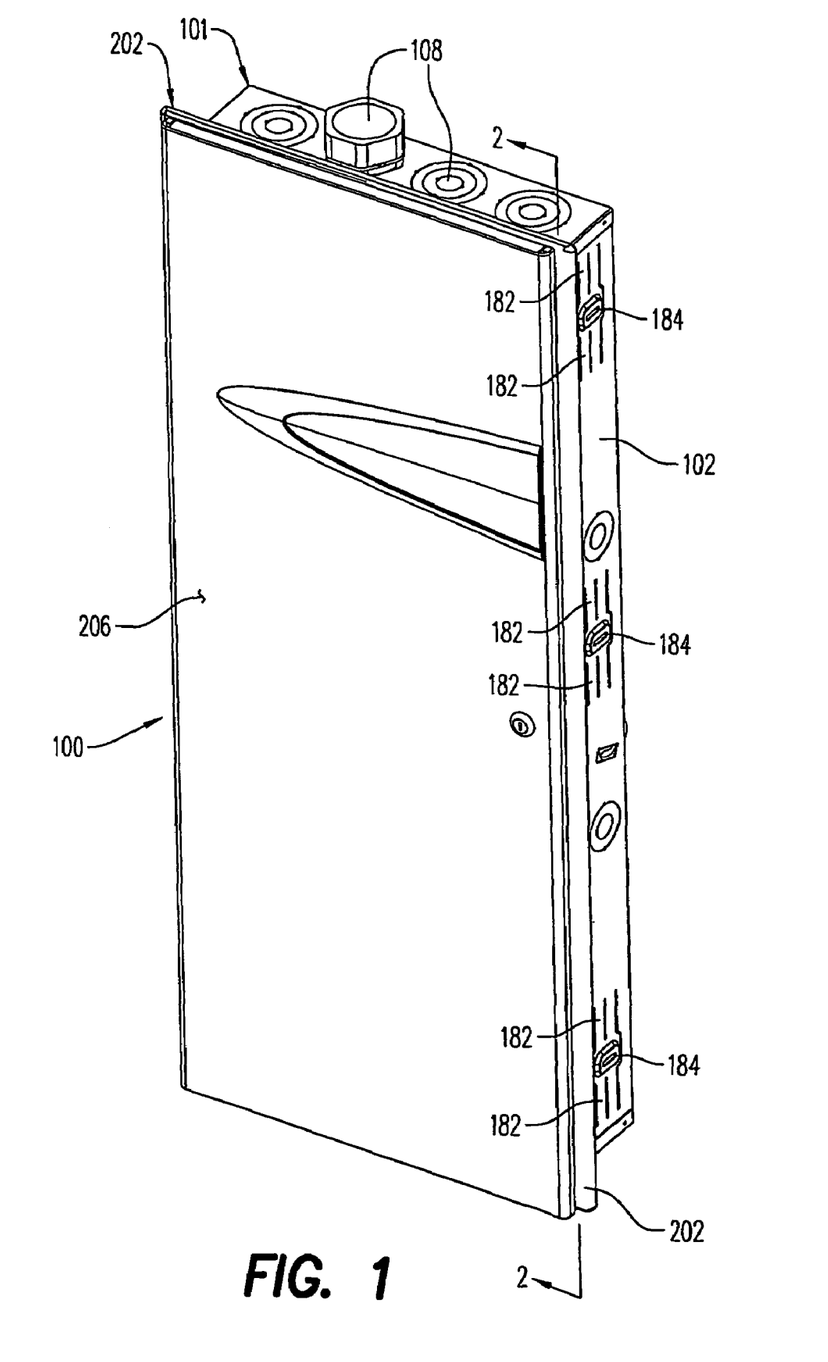
FIG. 1 is a perspective view of a structured wiring box according to the preferred embodiment of the invention.
Figure 2:
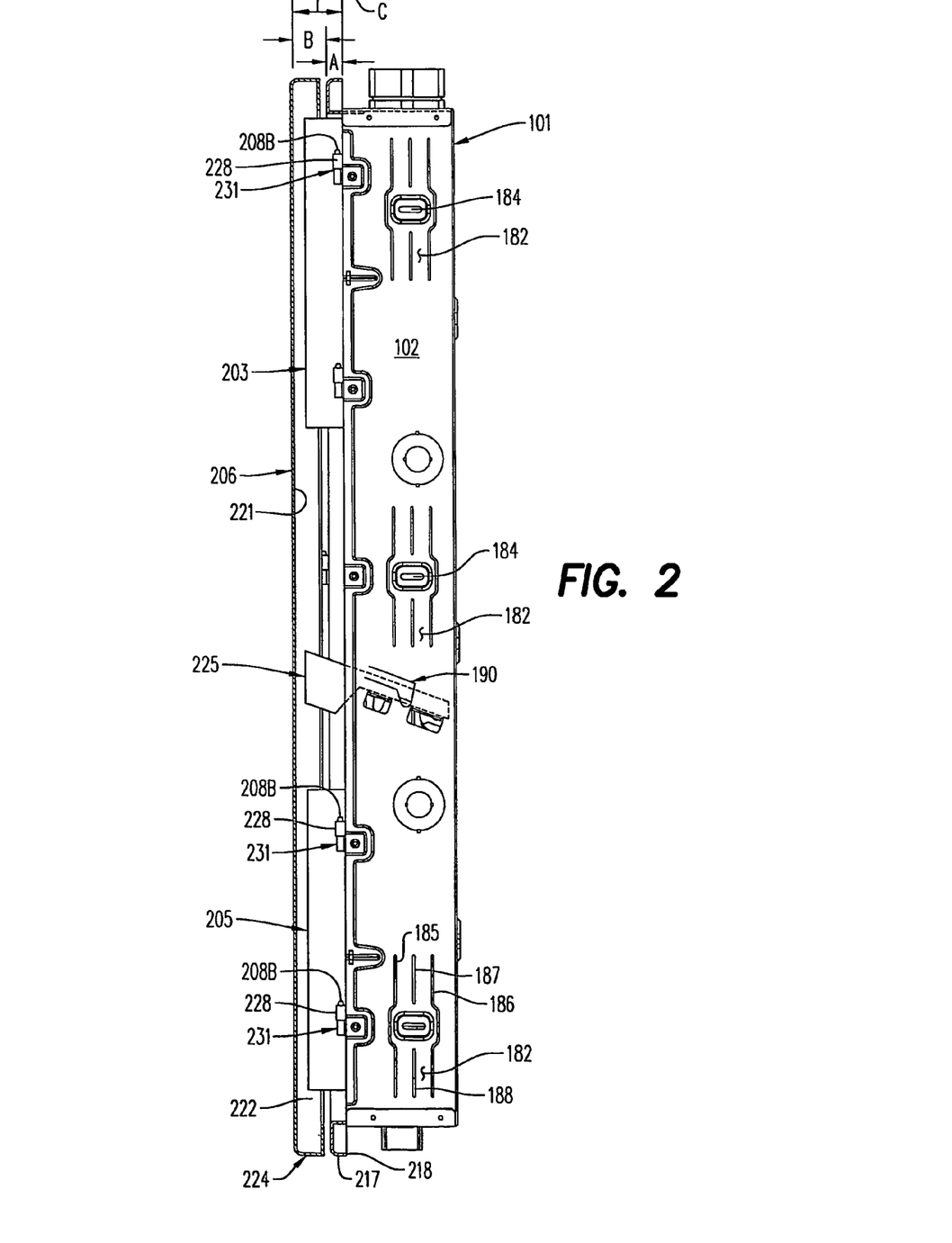
FIG. 2 is a cross-sectional view taken along lines 2-2 of FIG. 1.
Figure 3:
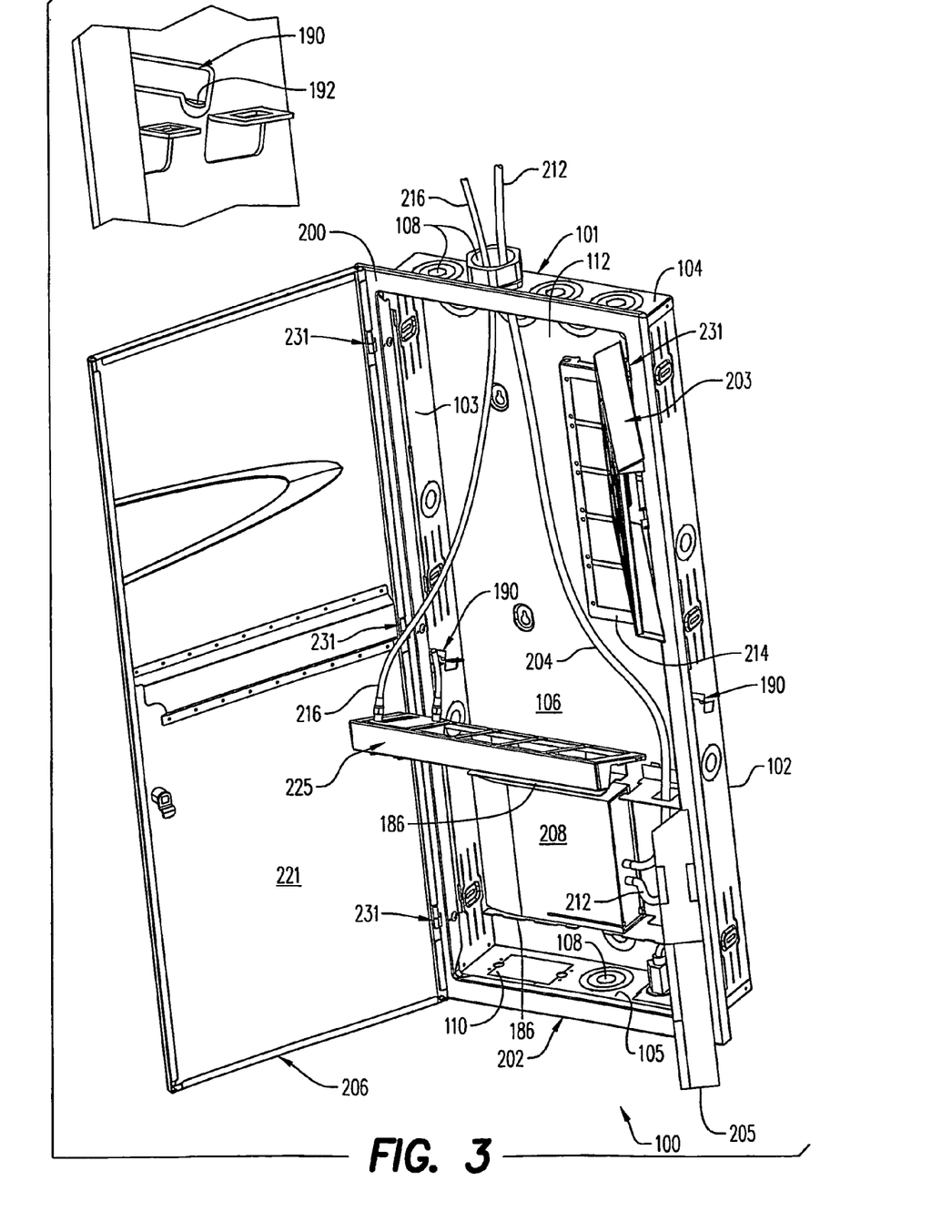
FIG. 3 is a perspective view of the structured wiring box of FIG. 1 with the cover door, module door, and computer server door opened.
Figure 4:
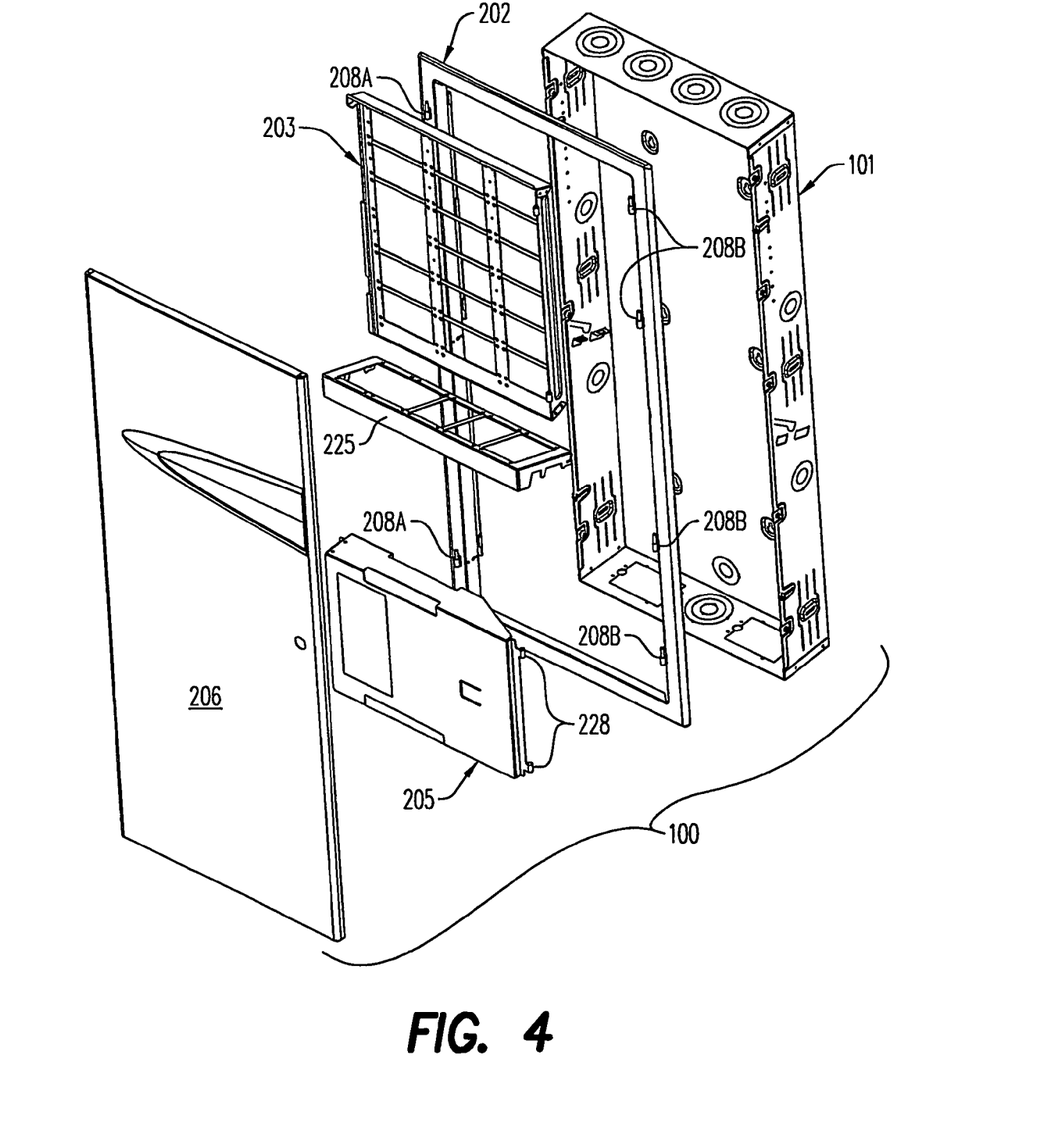
FIG. 4 is an exploded perspective view of the structured wiring box of FIG. 1.
Figure 5:
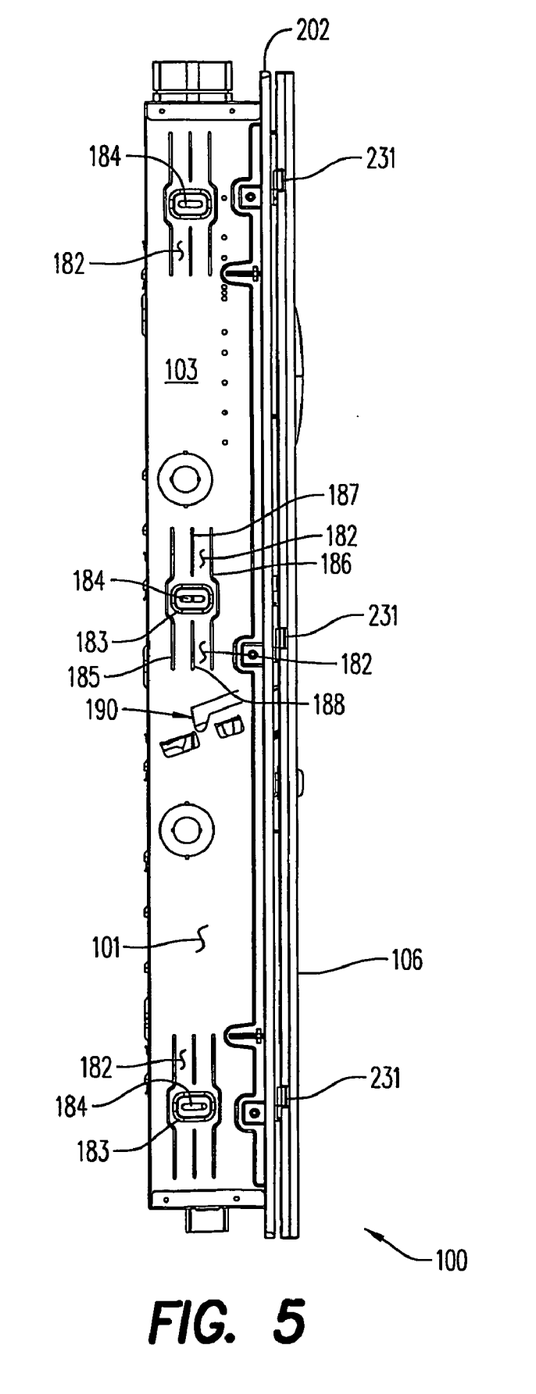
FIG. 5 is a left side view of the structured wiring box of FIG. 1.
Figure 6:
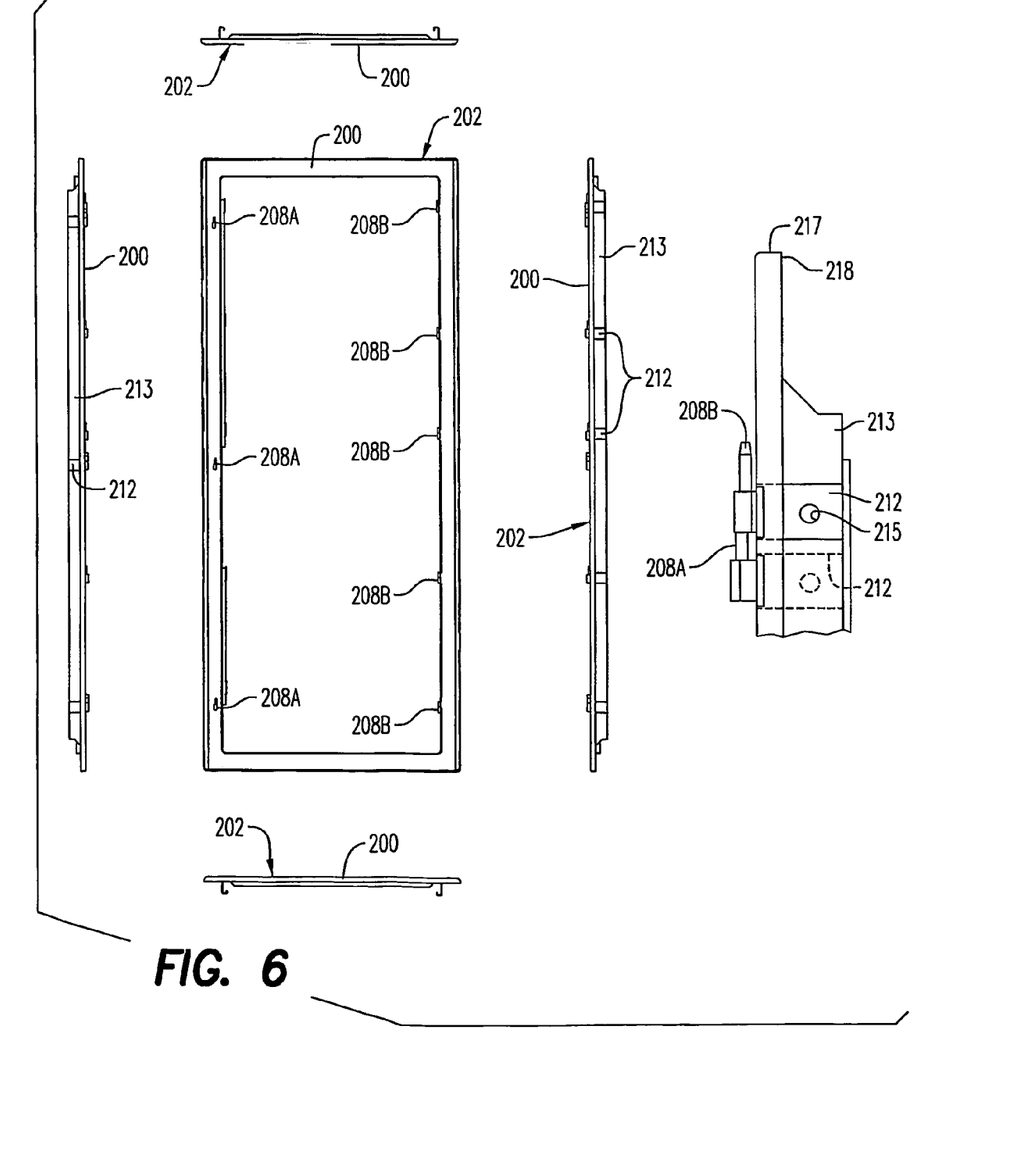
FIG. 6 is a detailed view of the trim ring of the structured wiring box of FIG. 1.
Figure 7:
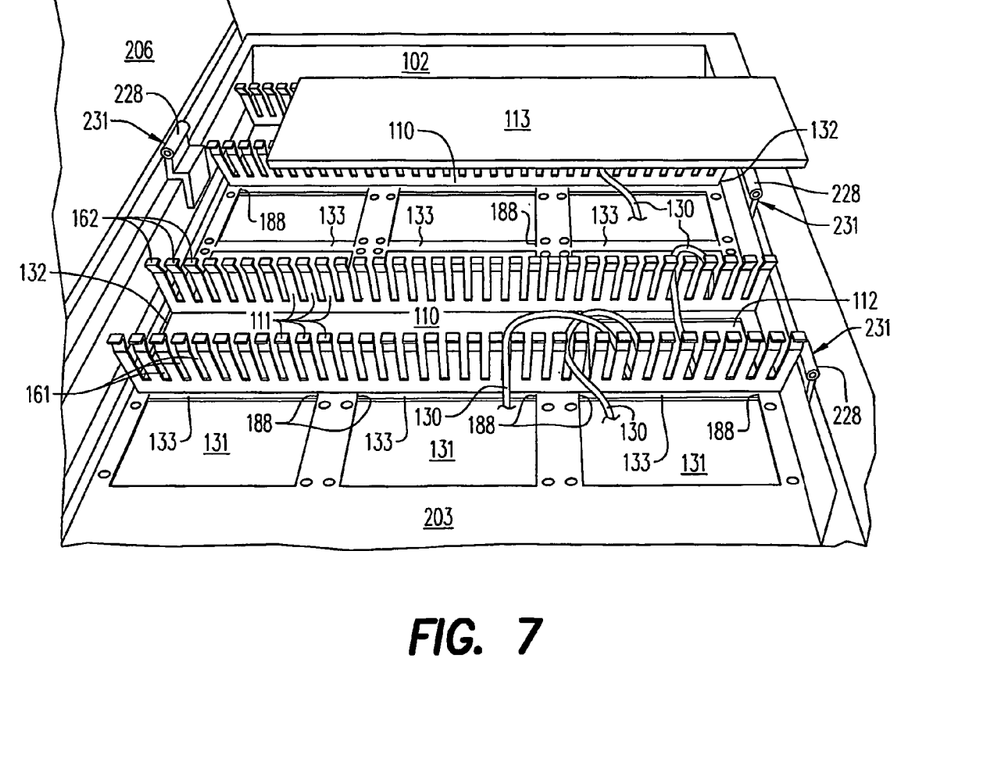
FIG. 7 is a detailed view of a framework door with attached electrical wire raceways.

A structured wiring box 100 according to the preferred embodiment of the invention is depicted in FIGS. 1 through 9. The structured wiring box 100 consists of a base box housing 101 that fits between standard sixteen-inch-on-center wall studs. As shown in FIG. 3, the base box 101 is formed by right and left side panels 102, 103, a top panel 104, a bottom panel 105, and a back panel 106. Together, the panels 102-106 form a housing chamber 112 having a front opening 110. Both the right and left side panels 102, 103 and the top and bottom panels 104, 105 are parallel and arranged orthogonally with the also parallel back panel 106 and opening 110 such that the housing 100 and housing chamber 112 are cubic. Formed in the top and bottom panels 104, 105 are access ports 108 for entry and exit of wiring extending into and out of the chamber 112. Preferably, the right and left panels 102, 103 are spaced slightly less than sixteen inches apart to facilitate mounting of the box 101 between wall studs (not shown).

In a default minimum configuration, a flat front cover (not shown) is used to close the structured wiring box 100 and hide the rough edges of sheet rock surrounding the mounting hole in the house's wall. All wires, components, and trim ring 202 includes a flange portion 203 extending parallel to the wall space so as to hide rough edges of the sheet rock hole providing a pleasing appearance for the unit on the wall. Other functions of the trim ring 202 are provided by built-in hinge pins 208A spaced along a left vertical section 209 of the trim ring 202 and hinge pins 208B spaced along a right vertical section 211 of the trim ring 202. The hinge pins 208A, 208B are mounted on tabs 212 secured to a sheet metal strip 213 projecting inwardly from an inner periphery of the trim ring 202. Holes 215 extending through the tabs 212 and a strip 213 receive screws (not shown) that secure the ring 202 to inner surfaces of the side panels 102, 103 of the box 101. The outer periphery of the trim ring 202 (FIG. 2) is formed by an inwardly curved rim 217 having an edge 218 for engaging the wall face (not shown) surrounding the box 101. Hinge pins 208A allow the easy addition of an outwardly projecting swinging cover door 206 as described below while hinges 208B allow the easy addition of swinging electrical component and module retaining framework doors 203, 205 (FIG. 3). Thus, addition of the trim ring 202 allows for upgrading without replacement of base box 101.

The hinge pins 208A allow a default cover (not shown) to be easily replaced with the outwardly projecting cover door 206. During such replacement, the hinge pins 208A receive hinge sleeves 228 mounted on door 206. Together, the pins 208A and sleeves 228 form hinges 231 which allow swinging movement of the door 206 between a closed position covering a composite chamber including the housing chamber 112 and an extension chamber 222 (described below) and an open position allowing access thereto. Similar hinge sleeves 218 are provided on the framework doors 203, 205. As shown in FIGS. 2, an inner surface 221 of the cover door 206 is outwardly spaced from the trim ring 202 by a distance B so as to establish a portion of an extension chamber 222 having a depth C. The space between the inner door surface 221 and the trim ring 202 is concealed by an inwardly projecting rim 224 along the perimeter of the door 206. In addition, the depth A of the trim ring 102 provided by the rim 217 establishes another portion of the extension chamber 222 which accommodates more and/or larger components. The extension chamber 222 provides space for modules and components that are otherwise too large to fit only within housing chamber 112. For example, the extension chamber accommodates the swinging framework doors 203, 205 as well as an outer portion of a removable framework rack 225 for retaining electrical components. Consequently, a new house built with minimal structured wiring cost can later support very complex configurations and many additional or larger components as upgrades or retrofit options are desired.

The hinges 231 are made with the bottom hinge pin 208A, 208B of a set longer than the others to allow for easier installation of the door 206 and modules 203, 205. The different length hinge pins allow the bottom hinge pin to be aligned with a hinge sleeve 228 and partially slid on without alignment of the other hinges. Once a bottom hinge sleeve 228 has been partially slid on a bottom pin 208, the remaining pins and sleeves are aligned and the door or module is moved into a fully retained position.

Figure 8:
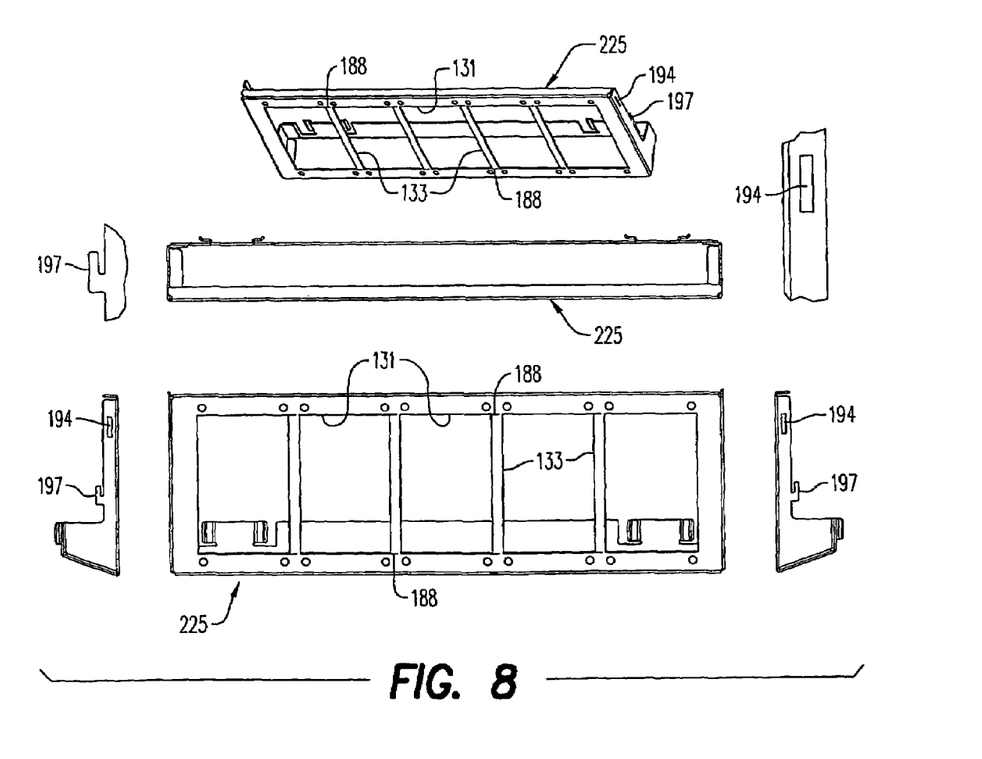
FIG. 8 is a detailed view of a slidably insertable framework tray.

Both of the framework doors 203 and 205 can be pivoted between first positions (FIGS. 2 and 6) within the extension chamber 222 and second positions (FIG. 3) outside thereof Once mounted on the doors 203, 205, modules (not shown) can easily be accessed from both front and back. This provides an installer with convenient access to change or rewire module connections located at either the rear or front without having to remove the module. The swinging framework door 203 defines parallel rows of module receiver spaces 131 as shown in FIG. 8. Between the spaces 131 are strips 133 having scores 188 at joints such tat they can be twisted out (FIG. 4) to accommodate double size modules.

Alternating rows 132 of module receiving spaces 131 are used to mount interior wire raceways 110 used to manage electrical cables and wires. The interior raceway 110 includes side walls formed by fingers 111 separated by slots 161. Module wiring 130 enters the nearest raceway through the wiring bay slots 161 in the raceway 110. The raceway fingers 111 hold the wires 130 securely and organize the wires to reduce clutter and keep the wires from interfering in the rewiring of modules. In addition, the interior wire raceway 110 routes the wires 130 to a rear facing raceway exit hole 112 located near the module door hinge 231 thereby enabling the framework door 203 to be pivoted into its second position without being constrained by their attached wiring. This arrangement both eliminates unnecessary wire clutter around the modules and insures that the wires will not catch or otherwise inhibit the free movement of the swinging module door 203.

A raceway cover 113 is slidably attached to hook portions 162 on the ends of fingers 111 and secures the wires 130 inside the raceway 110. Additionally, the flat surface on the face of the cover 113 provides an area for mapping the wiring 130 after routing within the raceway. The depth of the framework door 203 makes it possible to rework of the cable management and to slide off the raceway cover 113 without opening the door 203. It also allows sufficient room for the wires 130 exiting the raceway to bend at an appropriate bend angle. The raceway cover 113 can also be snapped on.

In addition to mounting modules on the pivoted door 203, modules such as amplifiers may be mounted in the base box 101 on the framework tray 225. Two mounting options are provided in the base box 101. For flush-mounting, the framework 225 can be mounted flat in the box to accommodate twisted pair modules only. Alternately, the tray 225 is mounted at an angle relative to horizontal (FIGS. 2 and 3) so as to eliminate undesirable wire bends for coax cable 216 and to simplify installation. As shown in FIG. 8, the tray 225 has the same type module holding spaces 131 and twist out module retaining strips 133 as the pivoted module door 203. Latch-guides 196 in the base box 101 slidably receive the framework tray 204. A hook 197 on the tray 204 engages the outer guide and a cutout 194 receives a spring 190. When the tray 204 is slid over the guides 196, the spring 190 snaps into the cutout 194 on the tray 204 and acts as the slide latching mechanism. To take the tray out, the springs 190 must be pushed to the outside to unlatch the tray 204 which then can be pulled out Movable shelves 186 can be used to also mount video amplifiers and other bulky components such as power supplies 208 connected to cables 212.

Figure 9:
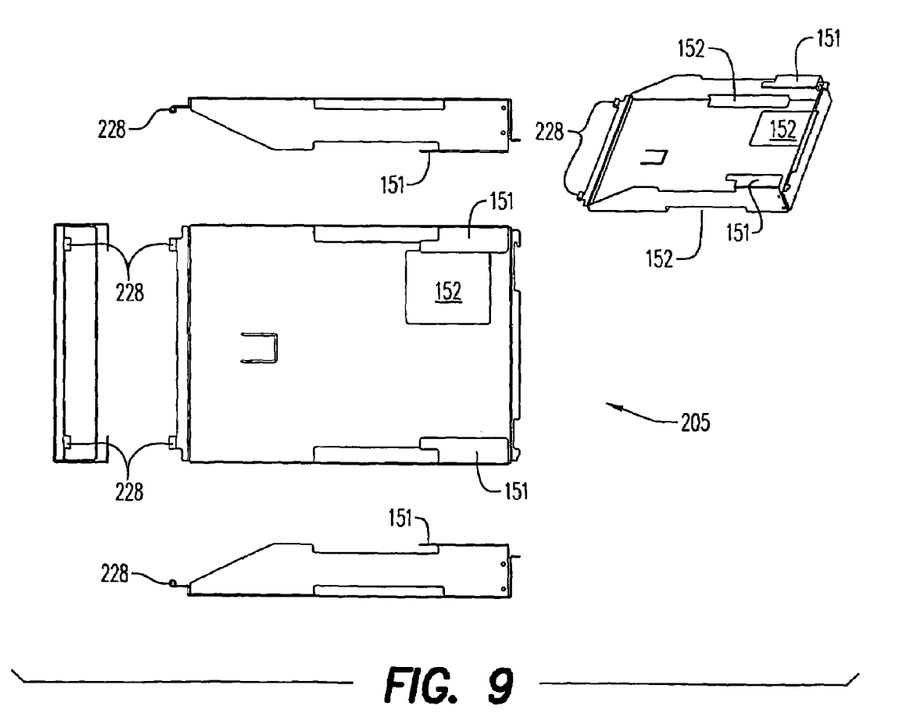
FIG. 9 is a detailed view of a framework door for a computer module.

The module door 205 can accommodate a computer (not shown) which is retained by flaps 151 as shown in FIG. 9. Also provided are strategically located air vents 152 that match the air vent locations of the computer. Hinge sleeves 228 allow the door 205 to be added or removed at any time.

It should be understood that the afore-described is merely the preferred one of many possible embodiments of the invention, and that the scope of the invention should therefore only be limited according to the following claims.

The invention claimed is:

1. Apparatus for receiving electrical components and wiring and adapted for mounting between adjacent studs of a wall structure, said apparatus comprising:

means forming a composite chamber and comprising a box having parallel, spaced apart right and left side panels for attachment to studs and spaced apart top and bottom panels having ends joined to ends of said right and left panels and arranged so as to form a housing chamber at least partially forming said composite chamber; and at least one framework door being pivotally mounted adjacent to an outer edge of one of said side panels and movable between a first position within an extension chamber and a second position outside said extension chamber, wherein said at least one framework door defines a plurality of parallel rows of spaces, each shaped to receive an electrical module, and wherein said at least one framework door further defines at least one electrical wire raceway disposed between adjacent rows of said plurality of parallel rows.

2. An apparatus according to claim 1 wherein each raceway comprises side walls defining openings into adjacent rows, said openings accommodating passage of electrical wires.

3. An apparatus according to claim 2 wherein said openings are vertical slots separated by fingers forming said side walls.

4. An apparatus according to claim 3 including a detachable cover closing each said raceway.

5. An apparatus according to claim 4 wherein said spaces are separated by scored strips detachable to provide larger spaces for receiving modules.

6. An apparatus according to claim 3, wherein each said finger defines a hook portion, said hook portions being shaped and arranged to secure electrical wires within said vertical slots.

7. An apparatus according to claim 1, wherein each raceway further defines an access opening for receiving electrical wires, and wherein said access opening is disposed adjacent to said one of said spaced apart right and left side panels.

8. An apparatus according to claim 1, further comprising a detachable cover closing each raceway.

9. An apparatus according to claim 1 wherein said housing chamber further comprises an annular frame surrounding outer edges of said panels and defining said extension chamber.

10. An apparatus according to claim 9 wherein said at least one framework door is located primarily in said extension chamber when said framework door occupies said first position.

11. An apparatus according to claim 9 wherein said at least one framework door is also removably mounted in said housing chamber.

12. An apparatus according to claim 11 wherein said at least one framework door is also slidably mounted in said housing chamber.

13. An apparatus according to claim 12 wherein said at least one framework door comprises one portion located in said housing chamber and another portion located in said extension chamber.

14. An apparatus according to claim 1, further comprising:
another framework door movable between a first position within said composite chamber and a second position outside said composite chamber, said another framework door being shaped and arranged to receive electrical components.

15. An apparatus according to claim 14 wherein said another framework door is slidably mounted in said housing chamber.

16. An apparatus according to claim 1 wherein said at least one framework door is slanted relative to horizontal.

* * * * *